United States Patent
Morimoto et al.

(10) Patent No.: US 8,159,848 B2
(45) Date of Patent: Apr. 17, 2012

(54) POWER CONVERSION CIRCUIT

(75) Inventors: Atsushi Morimoto, Aichi (JP); Matsuo Shiraishi, Aichi (JP); Kouichi Ishikawa, Aichi (JP); Tatsuo Morita, Kyoto (JP); Yasuhiro Uemoto, Shiga (JP); Tsuyoshi Tanaka, Osaka (JP)

(73) Assignee: Panasonic Corporation, Osaka (JP)

( * ) Notice: Subject to any disclaimer, the term of this patent is extended or adjusted under 35 U.S.C. 154(b) by 392 days.

(21) Appl. No.: 12/598,387

(22) PCT Filed: Dec. 11, 2008

(86) PCT No.: PCT/JP2008/003713
§ 371 (c)(1),
(2), (4) Date: Oct. 30, 2009

(87) PCT Pub. No.: WO2009/078148
PCT Pub. Date: Jun. 25, 2009

(65) Prior Publication Data
US 2010/0135053 A1    Jun. 3, 2010

(30) Foreign Application Priority Data
Dec. 17, 2007  (JP) .................................. 2007-324355

(51) Int. Cl.
*H02M 7/217* (2006.01)
(52) U.S. Cl. ......................................... 363/127; 363/17
(58) Field of Classification Search .............. 363/16–20, 363/21.7, 21.12, 56.01, 63, 65, 66, 127; 323/222, 323/224, 271, 272, 282, 288, 285; 327/109, 327/333, 320, 314; 318/254, 280, 681, 293
See application file for complete search history.

(56) References Cited

U.S. PATENT DOCUMENTS

| | | | |
|---|---|---|---|
| 5,555,494 A * | 9/1996 | Morris | ............................ 363/17 |
| 5,793,064 A * | 8/1998 | Li | .................................. 257/119 |
| 6,404,261 B1 * | 6/2002 | Grover et al. | ................. 327/320 |
| 7,355,368 B2 * | 4/2008 | Salato et al. | .................... 323/222 |
| 7,737,582 B2 * | 6/2010 | Jabaji et al. | .................... 307/126 |
| 2005/0218876 A1 | 10/2005 | Nino | |
| 2006/0033480 A1 | 2/2006 | Soldano | |

(Continued)

FOREIGN PATENT DOCUMENTS
JP    04-085956    3/1992
(Continued)

OTHER PUBLICATIONS

U.S. Appl. No. 12/596,770, filed Oct. 20, 2009.

*Primary Examiner* — Rajnikant Patel
(74) *Attorney, Agent, or Firm* — McDermott Will & Emery LLP

(57) ABSTRACT

A power conversion circuit includes a bidirectional switch 2. The bidirectional switch 2 has a first gate terminal G1, a second gate terminal G2, a first ohmic terminal S1 and a second ohmic terminal S2. The bidirectional switch 2 has four operation states. In the first state, the bidirectional switch 2 operates as a diode having a cathode as the first ohmic terminal S1 and an anode as the second ohmic terminal S2. In a second state, the bidirectional switch 2 operates as a diode having an anode as the first ohmic terminal S1 and a cathode as the second ohmic terminal S2. In a third state, the bidirectional switch 2 is bidirectionally conductive with via a diode between the first and second ohmic terminals S1 and S2. In a fourth state, the bidirectional switch 2 cuts off a bidirectional current between the first and second ohmic terminals.

6 Claims, 9 Drawing Sheets

U.S. PATENT DOCUMENTS

2006/0118818 A1   6/2006   Shimoida et al.

FOREIGN PATENT DOCUMENTS

| | | |
|---|---|---|
| JP | 2005-261059 | 9/2005 |
| JP | 2005-295671 | 10/2005 |
| JP | 2005-341722 | 12/2005 |
| JP | 2006-186307 | 7/2006 |
| JP | 2007-014193 | 1/2007 |
| JP | 2007-300133 | 11/2007 |

* cited by examiner

FIG.2
(a)
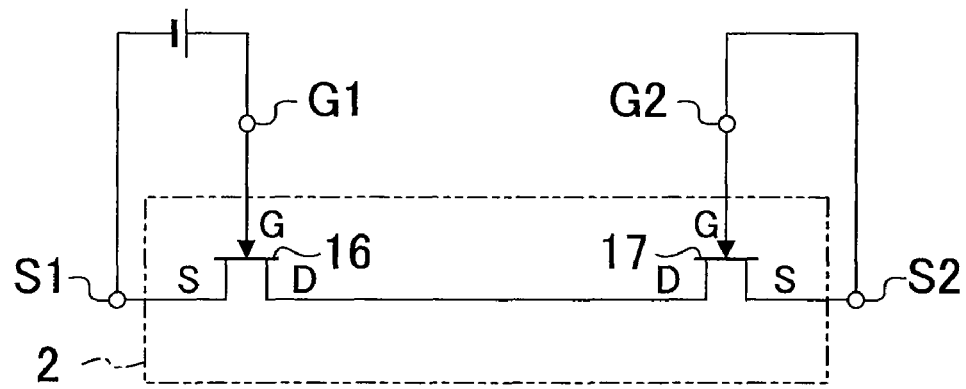
(b)
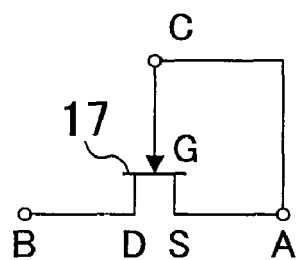
(c)
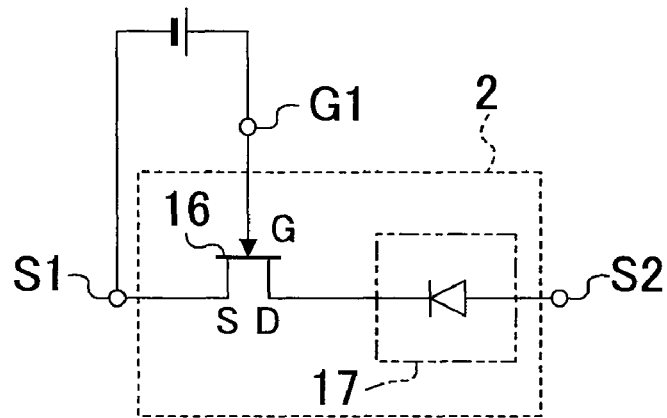

FIG.3
(a) 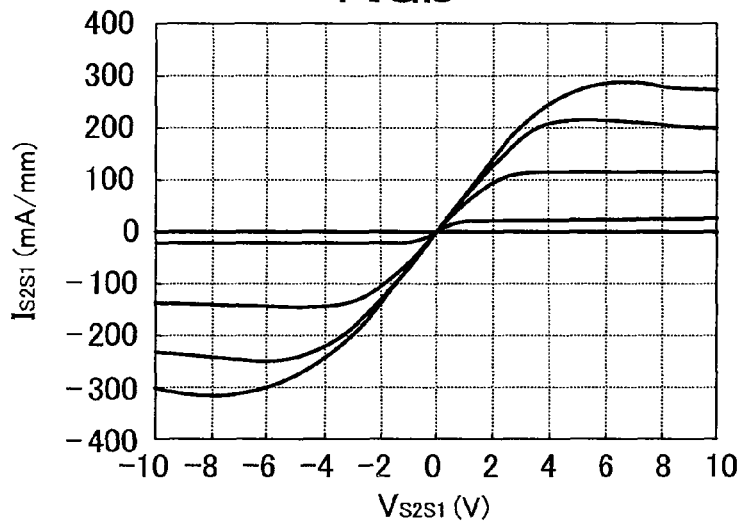
(b) 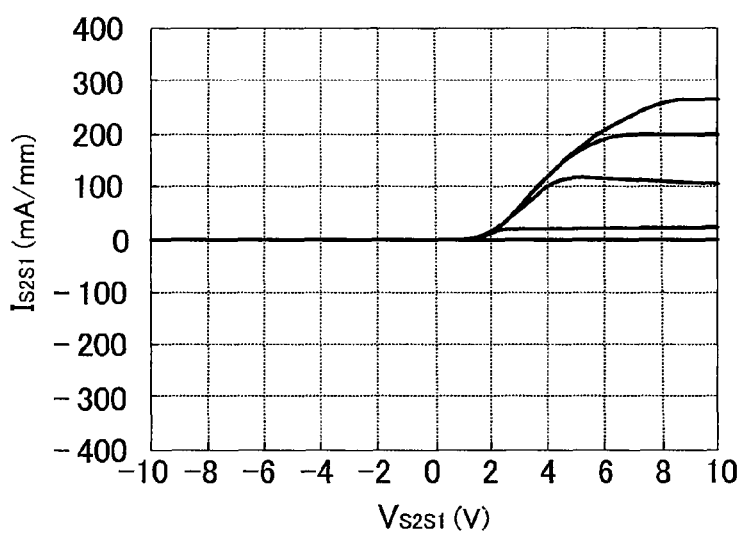
(c) 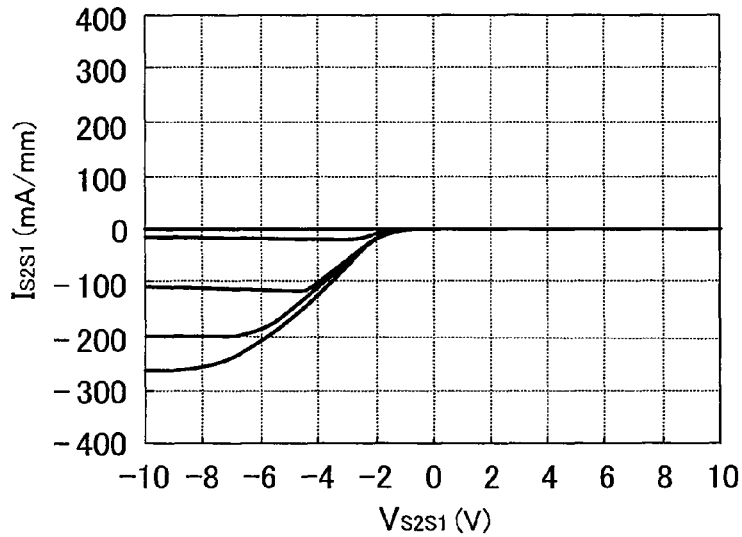

FIG.10
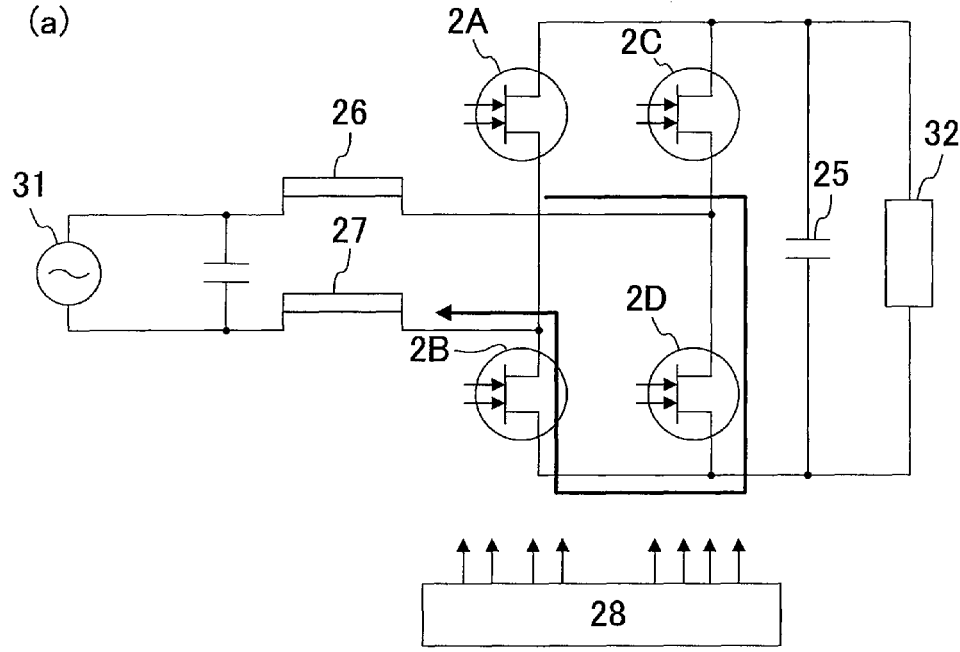
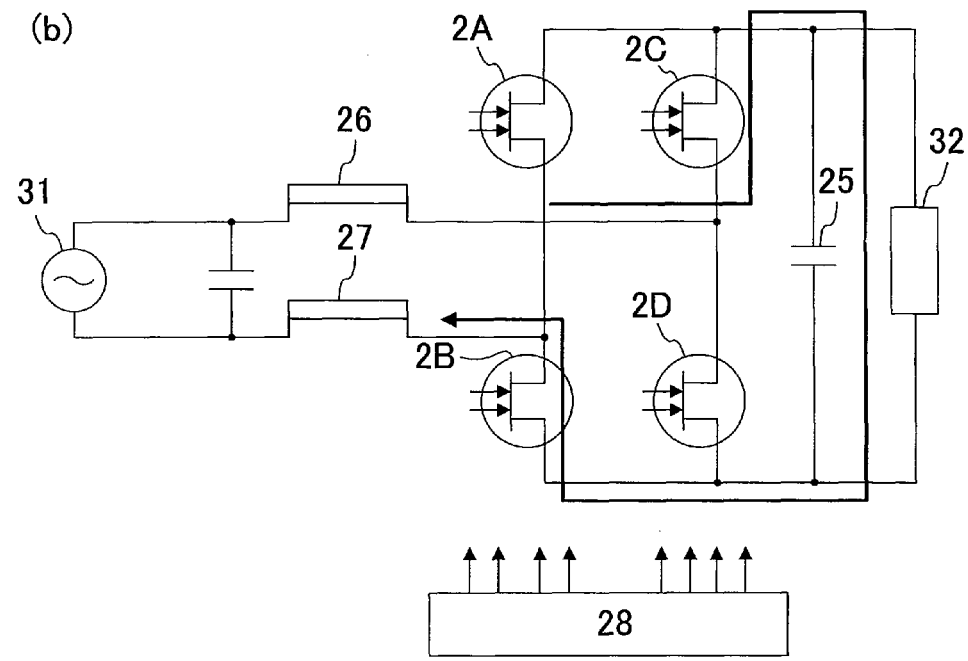

POWER CONVERSION CIRCUIT

RELATED APPLICATIONS

This application is the U.S. National Phase under 35 U.S.C. §371 of International Application No. PCT/JP2008/003713, filed on Dec. 11, 2008, which in turn claims the benefit of Japanese Application No. 2007-324355, filed on Dec. 17, 2007, the disclosures of which Applications are incorporated by reference herein.

TECHNICAL FIELD

The present invention relates to a power conversion circuit employing a bidirectional switch.

BACKGROUND ART

In recent years, electronic apparatuses are becoming more and more widespread. The increase in power consumption of electronic apparatuses is recognized as one of the causes for a social problem called global warming, or the like. Also, the increase of the power consumption leads to a need for cooling of electronic apparatuses, and therefore, a large cooling fin or cooling fan or the like is required, resulting in larger-size electronic apparatuses. In view of such social background, there is an increasing demand for electronic apparatuses having lower power consumption. To meet the demand, power consumption of a power supply circuit which is a basic part of an electronic apparatus, an actuator which is used to achieve a main function of an electronic apparatus, and the like, is expected to be reduced in all modes, such as standby mode, operation mode and the like.

In order to reduce the power consumption of electronic apparatuses, it is necessary to reduce the power consumption of, particularly, the power conversion circuit and the like. As a technique of reducing the power consumption of the power conversion circuit, it is known that a metal oxide film semiconductor FET (MOSFET) and an insulating gate bipolar transistor (IGBT) are separately used for respective different voltages used therein. A technique is also known in which a loss during switching is reduced by applying zero-voltage switching (ZVS) or zero-current switching (ZCS) to a switching circuit (see, for example, Patent Documents 1 and 2).

Patent Document 1: Japanese Laid-Open Patent Publication No. 2005-261059

Patent Document 2: Japanese Laid-Open Patent Publication No. 2005-295671

DISCLOSURE OF THE INVENTION

Problems to be Solved by the Invention

However, a typical power conversion circuit includes a combination of unidirectional switches. Therefore, when a load having an inductance component, such as a motor or the like, is connected thereto, a circulating current flows through a flywheel diode, resulting in an increase in loss in the power conversion circuit. Therefore, a large cooling fin or cooling fan or the like is required to avoid this, leading to an increase in size of an apparatus including the power conversion circuit.

Also, when a power conversion circuit includes a bidirectional switch including an antiparallel IGBT or the like, then if a load having an inductance component, such as a motor or the like, is connected thereto, it is difficult to form a closed loop for conducting a circulating current. When a bidirectional switch is provided in each of an upper arm and a lower arm, it is necessary to provide a dead time so as to prevent the arms from being short-circuited. Therefore, a dead time during which the upper-arm bidirectional switch and the lower-arm bidirectional switch are simultaneously in the OFF state, is required. As a result, there occurs a period of time during which a circulating current is not allowed to flow.

Moreover, in a typical boost chopper circuit, after charge is accumulated in a reactor on the input side, power is supplied via a diode to the output. In this case, there is a larger loss due to a turn-on voltage (Vf) of the diode and a current flowing through the diode, resulting in an increase in power consumption. Therefore, it is necessary to cool the circuit using a large-size cooling fin or cooling fan, leading to an increase in size of a device.

In the present disclosure, a power conversion device is disclosed in which upper and lower arms are prevented from being short-circuited, and a loss due to a circulating is reduced while a loop in which a circulating current flows during a transient period of a dead time is formed.

Solution to the Problems

The present disclosure provides an example power conversion circuit including a bidirectional switch employing a nitride semiconductor.

Specifically, the example power conversion circuit includes at least one bidirectional switch. The bidirectional switch has a first gate terminal, a second gate terminal, a first ohmic terminal and a second ohmic terminal. By causing the first gate terminal to be in the ON state and the second gate terminal to be in the OFF state, the bidirectional switch is caused to be in a first state in which the bidirectional switch operates as a diode having a cathode as the first ohmic terminal and an anode as the second ohmic terminal. By causing the first gate terminal to be in the OFF state and the second gate terminal to be in the ON state, the bidirectional switch is caused to be in a second state in which the bidirectional switch operates as a diode having an anode as the first ohmic terminal and a cathode as the second ohmic terminal. By causing the first and second gate terminals to be in the ON state, the bidirectional switch is caused to be in a third state in which the bidirectional switch is bidirectionally conductive without via a diode between the first and second ohmic terminals. By causing the first and second gate terminals to be in the OFF state, the bidirectional switch is caused to be in a fourth state in which a bidirectional current is cut off between the first and second ohmic terminals.

The example power conversion circuit includes the bidirectional switch which can be caused to be in the ON state only in the forward direction, in the ON state only in the backward direction, in the ON state in both the forward and backward directions, and in the OFF state in both the forward and backward directions. Therefore, the arms can be prevented from being short-circuited, and in addition, a current path which conducts an intended circulating current which occurs during a transient period that the ON and OFF states are switched, can be formed.

In this case, the bidirectional switch may have a semiconductor multilayer structure formed on a substrate, a first ohmic electrode and a second ohmic electrode formed on the semiconductor multilayer structure with a space being provided therebetween, a first p-type semiconductor layer and a second p-type semiconductor layer formed between the first and second ohmic electrodes with a space being provided therebetween, a first gate electrode formed on the first p-type semiconductor layer, and a second gate electrode formed on the second p-type semiconductor layer. The semiconductor multilayer structure includes a first nitride semiconductor layer, and a second nitride semiconductor layer which is formed on the first nitride semiconductor layer and has a larger band gap than that of the first nitride semiconductor layer. The first gate electrode may be connected to the first gate terminal, the second gate electrode may be connected to the second gate terminal, the first ohmic electrode may be connected to the first ohmic terminal, and the second ohmic electrode may be connected to the second ohmic terminal.

The example power conversion circuit may further include a unidirectional switch connected in series to the bidirectional switch, and a diode connected antiparallel to the unidirectional switch. The bidirectional switch, the unidirectional switch and the diode may constitute a first half-bridge circuit whose input or output is a connection node of the bidirectional switch and the unidirectional switch. In this case, the bidirectional switch may be caused to be in the third state when a voltage at the connection node is higher than an output voltage of the first half-bridge circuit.

Also, in the example power conversion circuit, the power conversion circuit includes multiple ones of the at least one bidirectional switch. Two of the bidirectional switches may be connected in series to constitute a second half-bridge circuit whose input or output is a connection node of the two bidirectional switches. In this case, when one of the two bidirectional switches is in the third state, the other bidirectional switch may be in a state other than the third state, and when one of the two bidirectional switches is in the fourth state, the other bidirectional switch may be in a state other than the fourth state.

EFFECT OF THE INVENTION

According to the power conversion circuit of the present disclosure, it is possible to achieve a power conversion device in which upper and lower arms are prevented from being short-circuited, and a loss due to a circulating is reduced while a loop in which a circulating current flows during a transient period of a dead time is formed.

BRIEF DESCRIPTION OF THE DRAWINGS

FIGS. 2A to 2C are circuit diagrams showing operation of the example bidirectional switch.

FIGS. 3A to 3C are voltage-current relationship diagrams showing operating states of the example bidirectional switches.

FIGS. 4A to 4D are circuit diagrams showing operating states of the example bidirectional switch.

FIGS. 10A and 10B are diagrams for describing state transition of the example converter circuit.

DESCRIPTION OF THE REFERENCE CHARACTERS

| | |
|---|---|
| 1 | bidirectional chopper circuit |
| 2 | bidirectional switch |
| 7 | substrate |
| 8 | buffer layer |
| 9 | semiconductor multilayer structure |
| 10 | first semiconductor layer |
| 11 | second semiconductor layer |
| 12A | first ohmic electrode |
| 12B | second ohmic electrode |
| 13A | first p-type semiconductor layer |
| 13B | second p-type semiconductor layer |
| 14A | first gate electrode |
| 14B | second gate electrode |
| 15 | protective film |
| 16 | first transistor |
| 17 | second transistor |
| 18 | reactor |
| 19 | MOSFET |
| 20 | capacitor |
| 21 | half-bridge circuit |
| 22 | converter circuit |
| 23 | first arm |
| 24 | second arm |
| 25 | capacitor |
| 26 | reactor |
| 27 | reactor |
| 28 | control unit |
| 31 | AC power supply |
| 32 | load |

BEST MODE FOR CARRYING OUT THE INVENTION

Embodiment

Figure 1:
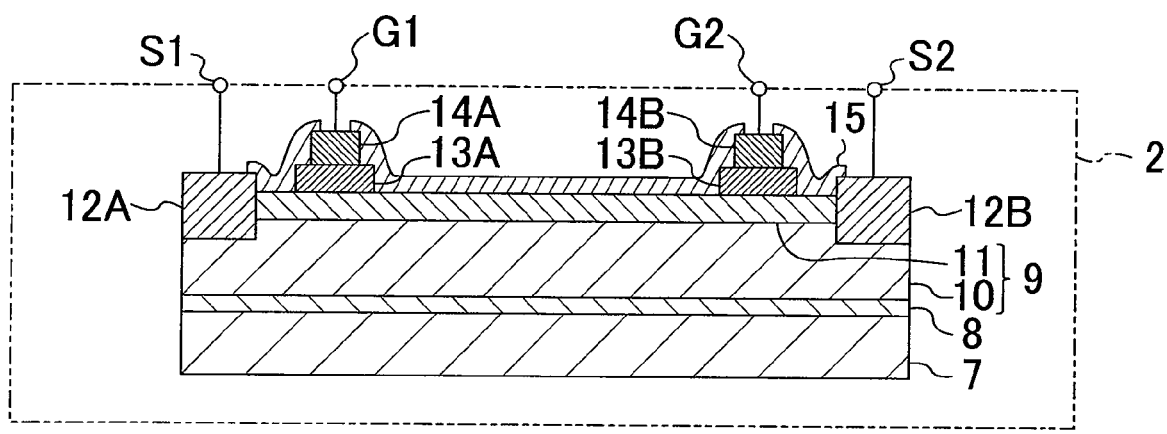
FIG. 1 is a cross-sectional view showing an example bidirectional switch.

Firstly, a bidirectional switch employing an example power conversion circuit will be described with reference to FIG. 1. As shown in FIG. 1, the bidirectional switch 2 has a first gate terminal G1, a second gate terminal G2, a first ohmic terminal S1, and a second ohmic terminal S2. The bidirectional switch 2 may have, for example, a configuration as follows.

A buffer layer 8 having a thickness of 1 μm in which aluminum nitride (AlN) having a thickness of 10 nm and gallium nitride (GaN) having a thickness of 10 nm are alternately laminated, is formed on a substrate 7 made of silicon (Si). A semiconductor multilayer structure 9 is formed on the buffer layer 8. The semiconductor multilayer structure 9 has a first semiconductor layer 10 and a second semiconductor layer 11, which are successively laminated, with the first semiconductor layer 10 being closer to the substrate 7 than the second semiconductor layer 11 is, and the second semiconductor layer 11 having a larger band gap than that of the first semiconductor layer 10. The first semiconductor layer 10 is made of undoped gallium nitride (GaN) having a thickness of 2 μm. The second semiconductor layer 11 is made of n-type aluminum gallium nitride (AlGaN) having a thickness of 20 nm. Charge caused by spontaneous polarization and piezoelectric polarization occurs in the vicinity of a heterointerface between the first and second semiconductor layers 10 and 11. As a result, in the vicinity of the heterointerface, a channel region is generated which is a two-dimensional electronic gas (2DEG) layer having a sheet carrier concentration of $1 \times 10^{13}$ cm$^{-2}$ or more and a mobility of 1000 cm$^2$V/sec or more.

A first ohmic electrode 12A and a second ohmic electrode 12B are formed on the semiconductor multilayer structure 9 with a space being provided therebetween. The first and second ohmic electrodes 12A and 12B are made of a multilayer of titanium (Ti) and aluminum (Al), and form an ohmic junction with the channel region. FIG. 1 shows an example in which, in order to reduce contact resistance, a portion of the second semiconductor layer 11 is removed and, in addition, a surface portion of about 40 nm in depth of the first semiconductor layer 10 is removed so that the first and second ohmic electrodes 12A and 12B contact an interface between the second semiconductor layer 11 and the first semiconductor layer 10. Note that the first and second ohmic electrodes 12A and 12B may be formed on the second semiconductor layer 11. In a region between the first and second ohmic electrodes 12A and 12B on the second semiconductor layer 11 of n type, a first p-type semiconductor layer 13A and a second p-type semiconductor layer 13B are selectively formed with a space being provided therebetween. A first gate electrode 14A is formed on the first p-type semiconductor layer 13A, and a second gate electrode 14B is formed on the second p-type semiconductor layer 13B. The first and second gate electrodes 14A and 14B are each made of a multilayer of palladium (Pd) and gold (Au), and each form an ohmic contact with the first p-type semiconductor layer 13A and the second p-type semiconductor layer 13B, respectively.

The first gate electrode 14A is connected to the first gate terminal G1, and the first ohmic electrode 12A is connected to the first ohmic terminal S1. A gate drive signal for driving the first gate electrode 14A is applied between the first gate terminal G1 and the first ohmic terminal S1. Also, the second gate electrode 14B is connected to the second gate terminal G2, and the second ohmic electrode 12B is connected to the second ohmic terminal S2. A gate drive signal for driving the second gate electrode 14B is applied between the second gate terminal G2 and the second ohmic terminal S2.

A protective film 15 made of silicon nitride (SiN) is formed, covering the second semiconductor layer 11 and the first and second p-type semiconductor layers 13A and 13B. By forming the protective film 15, a defect which causes so-called current collapse is compensated for, whereby current collapse can be ameliorated. The first and second p-type semiconductor layers 13A and 13B each have a thickness of 300 nm and are each made of magnesium (Mg)-doped p-type GaN. The first and second p-type semiconductor layers 13A and 13B each form a pn junction with the second semiconductor layer 11. As a result, when a voltage between the first ohmic electrode 12A and the first gate electrode 14A is, for example, 0 V, a depletion layer extends from the first p-type semiconductor layer 13A into the channel region, so that a current flowing the channel can be cut off. Likewise, when a voltage between the second ohmic electrode 12B and the second gate electrode 14B is, for example, 0 V or less, a depletion layer extends from the second p-type semiconductor layer 13B into the channel region, so that a current flowing the channel can be cut off. Therefore, a semiconductor device which performs a so-called normally-OFF operation can be achieved.

A potential of the first ohmic electrode 12A is represented by V1, a potential of the first gate electrode 14A is represented by V2, a potential of the second gate electrode 14B is represented by V3, and a potential of the second ohmic electrode 12B is represented by V4. In this case, for example, it is assumed that, if V2 is higher than V1 by 1.5 V or more, the depletion layer extending from the first p-type semiconductor layer 13A into the channel region is reduced, whereby a current can flow through the channel region. Likewise, it is assumed that, if V3 is higher than V4 by 1.5 V or more, the depletion layer extending from the second p-type semiconductor layer 13B into the channel region is reduced, whereby a current can flow through the channel region. In this case, so-called threshold voltages of the first and second gate electrodes 14A and 14B are both 1.5 V. In the description which follows, a threshold voltage of the first gate electrode 14A at which the depletion layer extending into the channel region below the first gate electrode 14A is reduced, whereby a current can flow through the channel region, is referred to as a first threshold voltage, and a threshold voltage of the second gate electrode 14B at which the depletion layer extending into the channel region below the second gate electrode 14B is reduced, whereby a current can flow through the channel region, is referred to as a second threshold voltage. Also, a distance between the first and second p-type semiconductor layers 13A and 13B is designed so that a maximum voltage applied between the first and second ohmic electrodes 12A and 12B can be withstood.

Next, operation of the bidirectional switch 2 will be described. For the purpose of description, it is assumed that the potential of the first ohmic electrode 12A is 0 V, a voltage applied to the first gate terminal G1 is Vg1, a voltage applied to the second gate terminal G2 is Vg2, a voltage between the second ohmic terminal S2 and the first ohmic terminal S1 is $Vs2s1$, and a current flowing between the second ohmic terminal S2 and the first ohmic terminal S1 is $Is2s1$.

It is assumed that, in a state that V4 is higher than V1 (e.g., V4 is +100 V and V1 is 0 V), Vg1 and Vg2 which are applied to the first and second gate terminals G1 and G2 are lower than the first and second threshold voltages, respectively (e.g., Vg1 and Vg2 are 0 V). In this case, the depletion layer extending from the first p-type semiconductor layer 13A extends in the channel region toward the second p-type semiconductor layer 13B, whereby a current flowing the channel can be cut off. Therefore, when a high positive voltage is applied to the second ohmic terminal S2, a cut-off state in which a current flowing from the second ohmic terminal S2 to the first ohmic terminal S1 is cut off can be achieved.

On the other hand, also when V4 is lower than V1 (e.g., V4 is −100 V and V1 is 0 V), the depletion layer extending from the second p-type semiconductor layer 13B extends into the channel region toward the first p-type semiconductor layer 13A, whereby a current flowing through the channel can be cut off. Therefore, also when a high negative voltage is applied to the second ohmic terminal S2, a current flowing from the first ohmic terminal S1 to the second ohmic terminal S2 can be cut off. Thus, the bidirectional switch 2 can cut off a bidirectional current.

In the case of the aforementioned structure and operation, the first and second gate electrodes 14A and 14B share the channel region for ensuring a sufficiently high breakdown voltage. Therefore, the bidirectional switch 2 can be achieved by using a channel region having an area corresponding to one device. In other words, the chip area of the entire bidirectional switch 2 can be caused to be smaller than when two diodes and two normally-off AlGaN/GaN HFETs are used. As a result, the cost and size of the bidirectional switch 2 can be reduced.

Next, it is assumed that the input voltages Vg1 and Vg2 of the first and second gate terminals G1 and G2 are higher than the first and second threshold voltages, respectively (e.g., Vg1 and Vg2 are 5 V). In this case, voltages applied to the first and second gate electrodes 14A and 14B are higher than the respective threshold voltages. Therefore, the depletion layers do not extend from the first and second p-type semiconductor layers 13A and 13B into the channel region. Therefore, the channel region is not pinched off below the first gate electrode 14A or below the second gate electrode 14B. As a result, a conductive state can be achieved in which a bidirectional current flows between the first ohmic terminal S1 and the second ohmic terminal S2.

Next, operation in a case where it is assumed that Vg1 is higher than the first threshold voltage and Vg2 is lower than or equal to the second threshold voltage, will be described. An equivalent circuit of the bidirectional switch 2 including the first and second gate terminals G1 and G2 can be considered as a circuit in which a first transistor 16 and a second transistor 17 are connected in series as shown in FIG. 2A. In this case, the source (S) of the first transistor 16 corresponds to the first ohmic terminal S1, and the gate (G) of the first transistor 16 corresponds to the first gate terminal G1. The source (S) of the second transistor 17 corresponds to the second ohmic terminal S2, and the gate (G) of the second transistor 17 corresponds to the second gate terminal G2. In such a circuit, for example, when it is assumed that Vg1 is 5 V and Vg2 is 0 V, the circuit is in a state equivalent to that in which the gate (G) and the source (S) of the second transistor 17 are short-circuited.

In the description which follows, it is assumed that the source (S), the drain (D) and the gate (G) of the second transistor 17 are a terminal A, a terminal B and a terminal C, respectively, as shown in FIG. 2B. In FIG. 2B, when a potential of the terminal B is higher than a potential of the terminal A, the second transistor 17 can be considered as a transistor whose source is the terminal A and whose drain is the terminal B. In such a case, a voltage between the terminal C (gate) and the terminal A (source) is 0 V, which is lower than or equal to the threshold voltage, and therefore, a current does not flow from the terminal B (drain) to the terminal A (source). On the other hand, when the potential of the terminal A is higher than the potential of the terminal B, the second transistor 17 can be considered as a transistor whose source is the terminal B and whose drain is the terminal A. In such a case, the potential of the terminal C (gate) is the same as that of the terminal A (drain), and therefore, when a potential of the terminal A with respect to the terminal B is lower than or equal to the threshold voltage, a current does not flow from the terminal A (drain) to the terminal B (source). When the potential of the terminal A with respect to the terminal B is higher than or equal to the threshold voltage, a voltage with respect to the terminal B (source) which is higher than or equal to the threshold voltage is applied to the gate, whereby a current can flow from the terminal A (drain) to the terminal B (source).

In other words, when the gate and the source of a transistor is short-circuited, the transistor functions as a diode, where the drain corresponds to the cathode and the source corresponds to the anode, and the forward turn-on voltage of the diode is the threshold voltage of the transistor. Therefore, a portion corresponding to the second transistor 17 of FIG. 2A can be considered as a diode, and therefore, an equivalent circuit as shown in FIG. 2C is obtained. In the equivalent circuit of FIG. 2C, when a potential of the second ohmic terminal S2 of the bidirectional switch 2 is higher than a potential of the first ohmic terminal S1 and 5 V is applied to the first gate terminal G1 of the first transistor 16, the first transistor 16 is in the ON state, and therefore, a current can flow from the second ohmic terminal S2 to the first ohmic terminal S1. Note that an ON voltage is generated by the forward turn-on voltage of the diode. Also, when the potential of the first ohmic terminal S1 is higher than the potential of the second ohmic terminal S2, the voltage is generated by the diode including the second transistor 17, and prevents a current from flowing from the first ohmic terminal S1 to the second ohmic terminal S2. In other words, by applying a voltage which is higher than or equal to the threshold voltage to the first gate terminal G1 and a voltage which is lower than or equal to the threshold voltage to the second gate terminal G2, the same operation as that of a circuit in which the drain of a transistor and the cathode of a diode are connected in series, can be achieved.

FIGS. 3A to 3C show a relationship between Vs2s1 and Is2s1 of the bidirectional switch 2. FIG. 3A shows a case where Vg1 and Vg2 are simultaneously changed. FIG. 3B shows a case where Vg1 is changed while Vg2 is 0 V, which is lower than or equal to the second threshold voltage. FIG. 3C shows a case where Vg2 is changed while Vg1 is 0 V, which is lower than or equal to the first threshold voltage. Note that, in FIGS. 3A to 3C, the horizontal axis indicates S2-S1 voltages (Vs2s1) with respect to the first ohmic terminal S1, and the vertical axis indicates S2-S1 currents (Is2s1), where a current flowing from the second ohmic terminal S2 to the first ohmic terminal S1 is a positive current. As shown in FIG. 3A, when Vg1 and Vg2 are 0 V and when Vg1 and Vg2 are 1 V, which is lower than or equal to the respective threshold voltages, Is2s1 does not flow when Vs2s1 is positive or when Vs2s1 is negative, and therefore, the bidirectional switch 2 is in the cut-off state. Also, when Vg1 and Vg2 are higher than the respective threshold voltages, a conductive state is established in which Is2s1 flows bidirectionally, depending on Vs2s1. On the other hand, as shown in FIG. 3B, when Vg2 is 0 V, which is lower than or equal to the second threshold voltage, and Vg1 is 0 V, which is lower than or equal to the first threshold voltage, Is2s1 is cut off in both directions. However, when Vg1 is 2 V to 5 V, which are higher than or equal to the first threshold voltage, then if Vs2s1 is lower than 1.5 V, Is2s1 does not flow, and then if Vs2s1 is higher than or equal to 1.5 V, Is2s1 flows. In other words, a current flows only from the second ohmic terminal S2 to the first ohmic terminal S1, and a current does not flow from the first ohmic terminal S1 to the second ohmic terminal S2 (reverse blocking state). Also, when Vg2 is changed while Vg1 is 0 V, a current flows only from the first ohmic terminal S1 to the second ohmic terminal S2, and a current does not flow from the second ohmic terminal S2 to the first ohmic terminal S1 (reverse blocking state) as shown in FIG. 3C.

As described above, the bidirectional switch 2 has a function of cutting off and conducting a bidirectional current under a gate bias condition, and can also perform diode operation. In the diode operation, the bidirectional switch 2 can switch the direction in which a current flows. Specifically, when the first gate terminal G1 of the bidirectional switch 2 is in the ON state and the second gate G2 is in the OFF state, a first state as shown in FIG. 4A is established. The first state is equivalent to a state in which a bidirectional switch in which two transistors are connected in an antiparallel fashion and which is in the conductive state, and a diode are connected in series. Moreover, the bidirectional switch is in the ON state, in which a bidirectional current flows, which is equivalent to a diode having a cathode as the first ohmic electrode S1 and an anode as the second ohmic electrode S2. When the first gate terminal G1 is in the OFF state and the second gate G2 is in the ON state, a second state as shown in FIG. 4B is established. The second state is equivalent to a diode having an anode as the first ohmic electrode S1 and a cathode as the second ohmic electrode S2. When the first and second gate terminals G1 and G2 are in the ON state, a third state as shown in FIG. 4C is established. The third state is a conductive state in which a bidirectional current flows between the first ohmic electrode S1 and the second ohmic electrode S2. When the first and second gate terminals G1 and G2 are in the OFF state, a fourth state as shown in FIG. 4D is established. The fourth state is a cut-off state in which a bidirectional current is cut off between the first ohmic electrode S1 and the second ohmic electrode S2. In the third state, no diode is present, and therefore, an ON voltage which is generated by the forward turn-on voltage of a diode does not occur.

The bidirectional switch 2 is similar to junction FETs (JFETs), however, is operated in an operating principle which is totally different from that of JFETs, i.e., carrier injection is intentionally performed in the bidirectional switch 2, although carrier modulation is performed in the channel region by a gate electric field in JFETs. Specifically, the bidirectional switch 2 operates as a JFET until the gate voltage reaches 3 V, however, when a gate voltage which is higher than or equal to 3 V, which exceeds the built-in potential of the pn junction, holes are injected into the gate, so that the amount of a current increases in accordance with the aforementioned mechanism, and therefore, a large-current and low-ON-resistance operation can be achieved.

Also, in the bidirectional switch 2, the first gate electrode 14A is formed on the first p-type semiconductor layer 13A having p-type conductivity, and the second gate electrode 14B is formed on the second p-type semiconductor layer 13B having p-type conductivity. Therefore, by applying a forward bias voltage to a channel region which is generated in an interface region between the first semiconductor layer and the second semiconductor layer, from the first and second gate electrodes 14A and 14B, holes can be injected into the channel region. In nitride semiconductors, the mobility of holes is much lower than the mobility of electrons, and therefore, holes injected into the channel region substantially do not contribute to carriers which flow as a current. Therefore, holes injected from the first and second gate electrodes 14A and 14B generate an equal amount of electrons in the channel region, which enhances the effect of generating electrons in the channel region, and therefore, function as donor ions. In other words, this enables modulation of the concentration of carriers in the channel region, thereby making it possible to achieve a normally-off nitride semiconductor layer bidirectional switch having a large operating current.

Next, a bidirectional chopper circuit 1 which is an example of the power conversion circuit will be described with reference to FIG. 5.

Figures 4, 5:
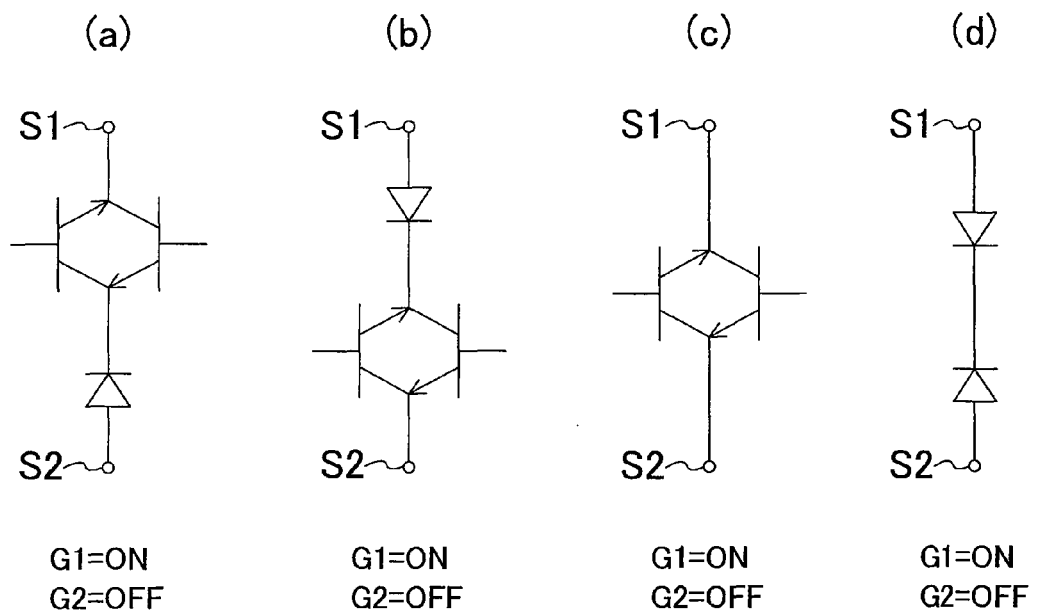
FIG. 5 is a circuit diagram showing an example bidirectional chopper circuit.

As shown in FIG. 5, the bidirectional chopper circuit 1 includes a reactor 18, a MOSFET 19, a bidirectional switch 2, and a capacitor 20 which suppresses an output ripple voltage. The example bidirectional chopper circuit 1 employs the bidirectional switch 2 having the aforementioned configuration instead of a rectifier diode which is used in a typical bidirectional chopper circuit. The MOSFET 19 is considered as including a unidirectional switch which short-circuits between p and n regions and a diode which is connected to the unidirectional switch in an antiparallel fashion. The bidirectional switch 2 and the MOSFET 19 are connected in series to form a half-bridge circuit 21, in which an input is applied to an intermediate node N1 at which the bidirectional switch 2 and the MOSFET 19 are connected to each other, or an output is extracted from the intermediate node N1. In the description which follows, the first ohmic terminal S1 of the bidirectional switch 2 is connected to a first terminal T1 of the bidirectional chopper circuit 1, and the second ohmic terminal S2 is connected to a second terminal T2 of the bidirectional chopper circuit 1.

Figure 6:
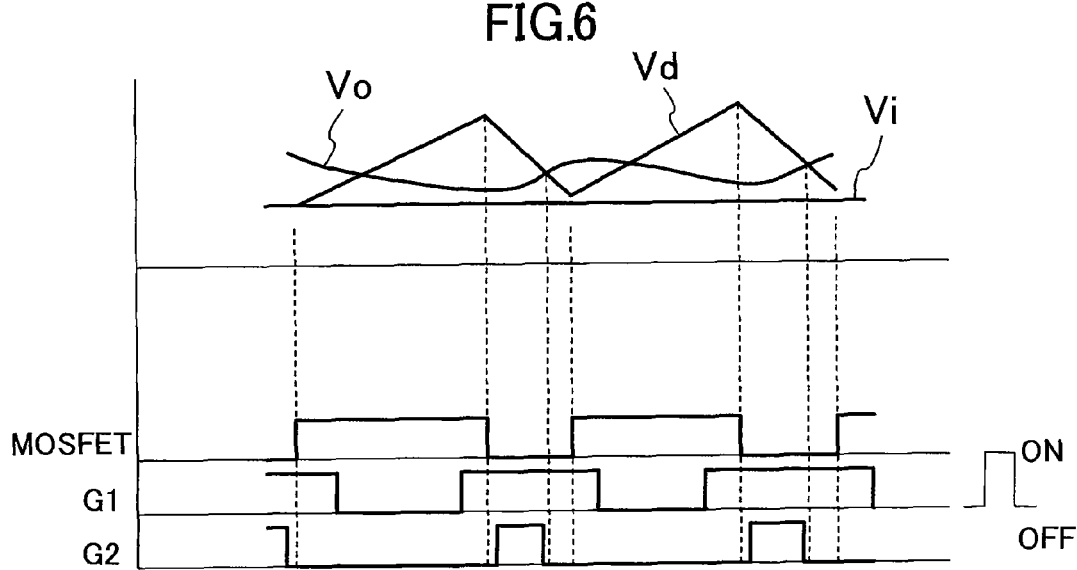
FIG. 6 is a timing chart showing operation of the example bidirectional chopper circuit.
Figure 7:
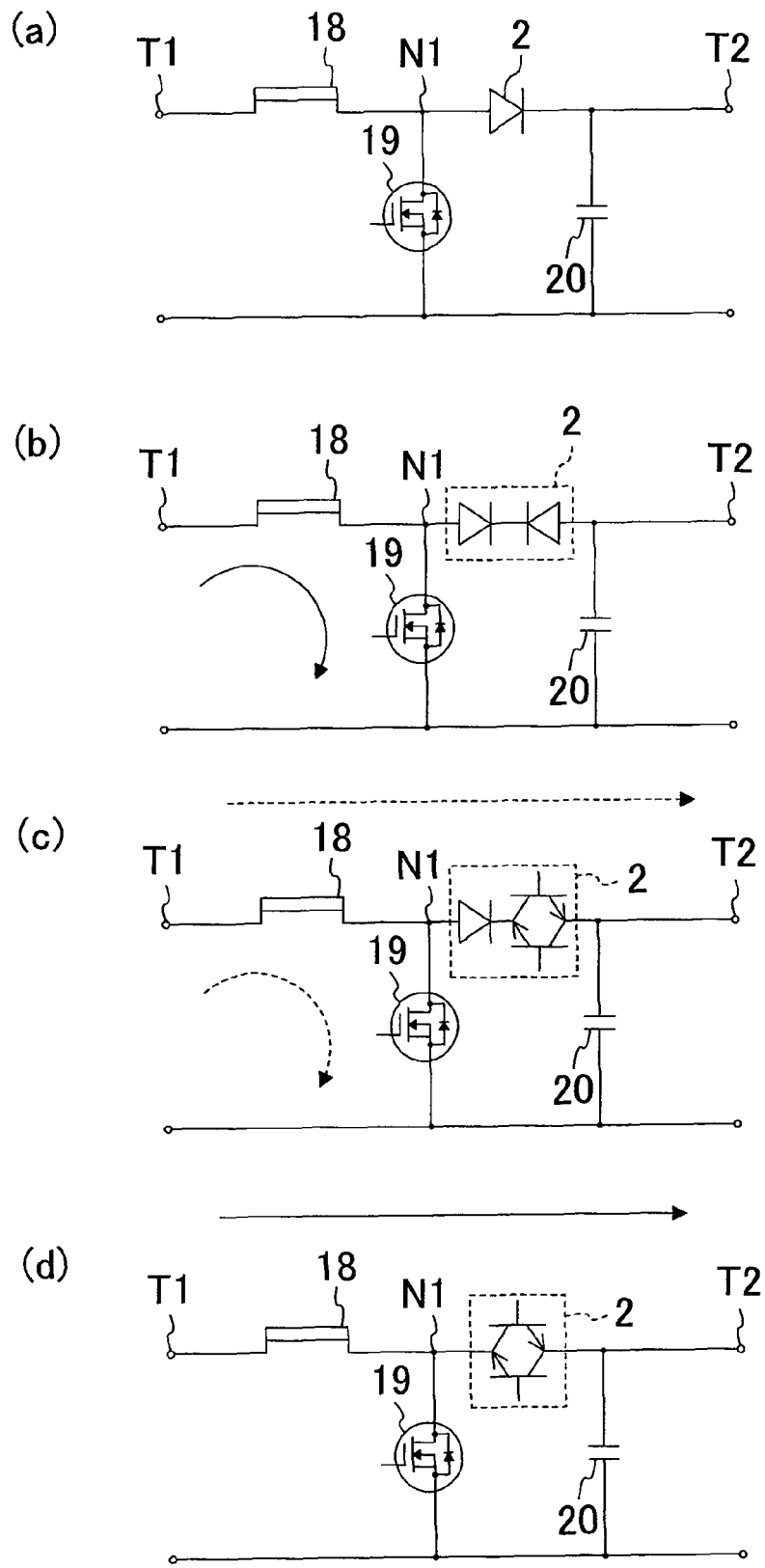
FIGS. 7A to 7D are circuit diagrams for describing state transition of the example bidirectional chopper circuit.

Next, operation of the bidirectional chopper circuit 1 will be described. FIG. 6 shows operation timings of the example bidirectional chopper circuit 1. FIGS. 7A to 7D show state transition of the circuit. As shown in FIG. 7A, if the bidirectional switch 2 is caused to function as a diode, the bidirectional chopper circuit 1 can be driven as a boost chopper circuit to output power from the first terminal T1 to the second terminal T2 as in a typical bidirectional chopper circuit. However, when the bidirectional switch 2 continues to function as a diode, a loss occurs which corresponds to power which is obtained by multiplying the forward turn-on voltage of the diode by a current flowing therethrough.

In order to avoid the occurrence of the power loss, the bidirectional switch 2 may be caused to be in the third state of FIG. 4C to reduce the loss. When the bidirectional switch 2 is caused to be in the third state in which a current flows bidirectionally, then if a voltage Vd at the intermediate node N1 is higher than a voltage which is obtained by adding a voltage Vo of the second terminal T2 and a voltage drop, power can be delivered from the first terminal T1 to the second terminal T2. However, when the voltage decreases, so that the voltage Vo on the second terminal T2 is higher than the voltage Vd at the intermediate node N1, a desired characteristic is not obtained, and power is delivered in the reverse direction, and therefore, the output voltage is not stable. Note that the voltage drop can be calculated based on an ON resistance and a flowing current of the bidirectional switch 2. In order to avoid the delivery of power in the reverse direction, the bidirectional switch 2 may be caused to be in the fourth state in which a bidirectional current is cut off or in the first state in which the bidirectional switch 2 operates as a diode having an anode as the first terminal T1 and a cathode as the second terminal T2, when the voltage Vd at the intermediate node N1 is lower than the voltage Vo on the second terminal T2.

However, when the MOSFET 19 is turned OFF from the ON state, electric energy accumulated in the reactor 18 needs to be output as the voltage Vo on the second terminal T2. Therefore, when the MOSFET 19 is turned OFF, the bidirectional switch 2 needs to be in the first state in which the bidirectional switch 2 operates as a diode, or in the third state in which the bidirectional switch 2 can conduct a bidirectional current. Therefore, before the MOSFET 19 is turned OFF, the first gate terminal G1 of the bidirectional switch 2 is caused to be in the OFF state and the second gate terminal G2 of the bidirectional switch 2 is caused to be in the ON state, thereby causing the bidirectional switch to be in the second state. Thereafter, in order to reduce a loss due to diode operation in the bidirectional switch 2, both the first and second gate terminals G1 and G2 are caused to be in the ON state, thereby causing the bidirectional switch 2 to be in the third state in which a bidirectional current flows. Also, if the bidirectional switch 2 is continuously kept in the third state, discharge of charge accumulated in the reactor 18 causes the voltage Vd at the intermediate node N1 to decrease, so that a current flows from the second terminal T2 to the first terminal T1. Therefore, the second gate terminal G2 is turned OFF, whereby the bidirectional switch 2 is returned to diode operation.

Specifically, ON-OFF control as shown in a timing chart of FIG. 6 may be performed. By turning ON the first gate terminal G1 before turning OFF the MOSFET 19, the bidirectional switch 2 is caused to be in the first state in which the bidirectional switch 2 operates as a diode. Thus, the bidirectional chopper circuit 1 is caused to be in a state as shown in FIG. 7C. In the first state, the bidirectional switch 2 is equivalent to a diode having an anode as the second ohmic terminal S2 and a cathode as the first ohmic terminal S1. Therefore, a current does not flow backward from the second terminal T2 to the first terminal T1. Thereafter, when the MOSFET 19 is turned OFF, the voltage Vd at the intermediate node N1 increases. When the voltage Vd exceeds the voltage Vo on the second terminal T2 and the forward voltage of the bidirectional switch 2, a current flows forward through the bidirectional switch 2. However, when the bidirectional switch 2 is held in the first state, a power loss occurs which is determined based on the forward turn-on voltage of the diode and a current flowing therethrough. Therefore, as the next step, the second gate terminal G2 is turned ON, whereby the bidirectional switch 2 is caused to be in the third state in which a bidirectional current flows. As a result, the bidirectional chopper circuit 1 transitions to a state shown in FIG. 7D. Therefore, a current can be supplied without a power loss due to the diode. Moreover, in the next step, the second gate G2 is turned OFF before the voltage Vd at the intermediate node N1 becomes lower than the voltage Vo of the second terminal T2, whereby the bidirectional switch 2 is caused to be in the first state. By repeatedly performing this cycle, a loss which is determined based on the forward voltage and the flowing current is always reduced during the ON period in the diode located in the bidirectional switch 2.

As described above, the example bidirectional switch 2 can achieve the second state in which the bidirectional switch 2 operates as a diode and allows a current to flow forward only, the first state in which the bidirectional switch 2 operates as a diode and allows a current to flow backward only, the third state in which a bidirectional current flows, and therefore, a loss due to a diode does not occur, and the fourth state in which a bidirectional current is cut off. As a result, a period of time during which a current flows through the diode can be reduced, whereby a loss due to the diode can be reduced. Therefore, power consumed by the bidirectional switch 2 is attributed to the ON resistance of the transistor, whereby the loss can be reduced, which leads to a reduction in size of a cooling fin or cooling fan.

Although a bidirectional chopper circuit has been described as an example of the power conversion circuit, other boost chopper circuits and the like may provide substantially the same operational effect.

Also, although a MOSFET has been described as an example of the unidirectional switch connected in series to the bidirectional switch, other devices or circuits, such as an IGBT and the like, may provide substantially the same operational effect.

Moreover, the sequence of ON and OFF may be interchanged between the first and second gate terminals G1 and G2, depending on the circuit configuration.

(Variation)

Figure 8:
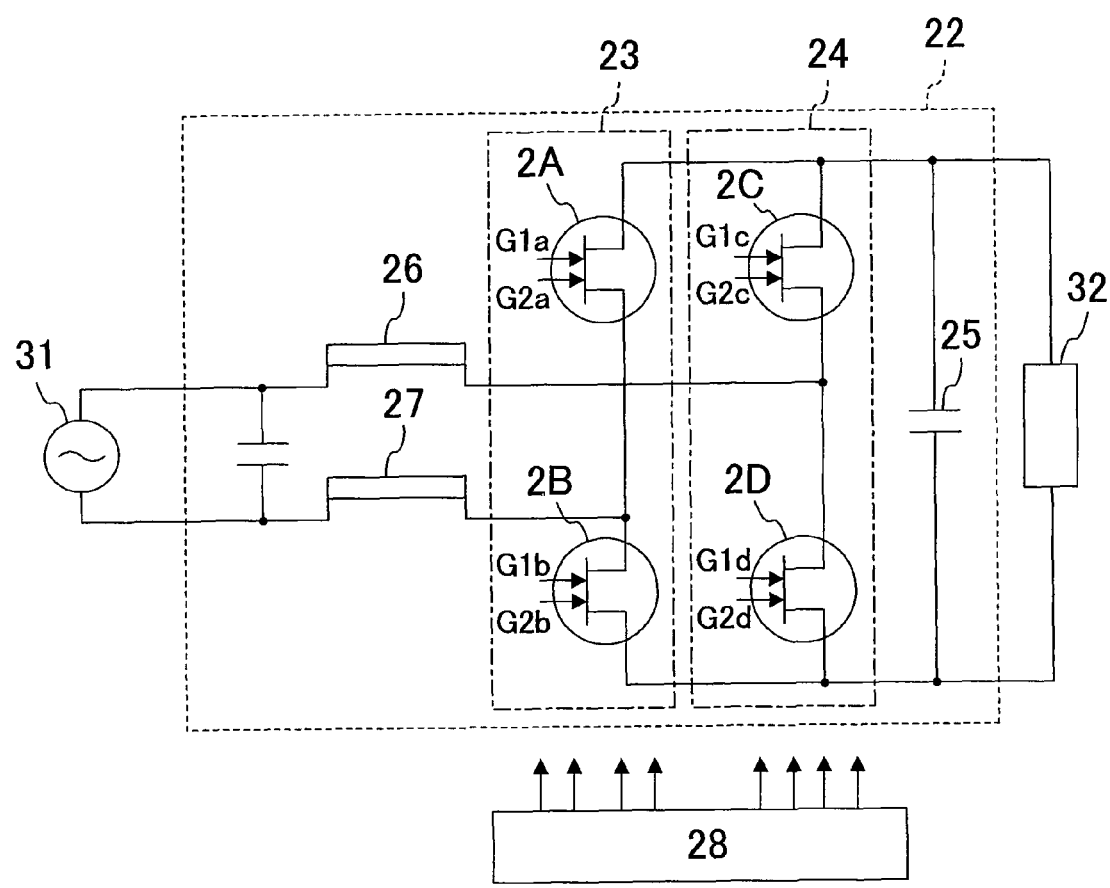
FIG. 8 is a circuit diagram showing an example converter circuit.

FIG. 8 shows a power conversion circuit according to this variation which is an AC/DC converter circuit for converting an AC voltage into a DC voltage which is higher than a peak voltage of an AC power supply. The converter circuit 22 has a bridge circuit in which a first arm 23 and a second arm 24 are connected in parallel. The first arm 23 is a half-bridge circuit in which a bidirectional switch 2A as the upper arm and a bidirectional switch 2B as the lower arm are connected in series. The second arm 24 is a half-bridge circuit in which a bidirectional switch 2C as the upper arm and a bidirectional switch 2D as the lower arm are connected in series. A load 32 is connected to the outputs of the first arm 23 and the second arm 24. A capacitor 25 is connected in parallel to the load 32. A connection node between the bidirectional switches 2A and 2B and a connection node between the bidirectional switches 2C and 2D are connected via a reactor 26 and a reactor 27, respectively, to the AC power supply 31.

The bidirectional switch 2A has a first gate G1a and a second gate G2a. The bidirectional switch 2B has a first gate G1b and a second gate G2b. The bidirectional switch 2C has a first gate G1c and a second gate G2c. The bidirectional switch 2D has a first gate G1d and a second gate G2d. A control unit 28 provided outside the converter circuit 22 controls the ON and OFF states of the first gate terminals G1a to G1d and the second gate terminals G2a to G2d of the bidirectional switches 2A to 2D.

Figure 9:
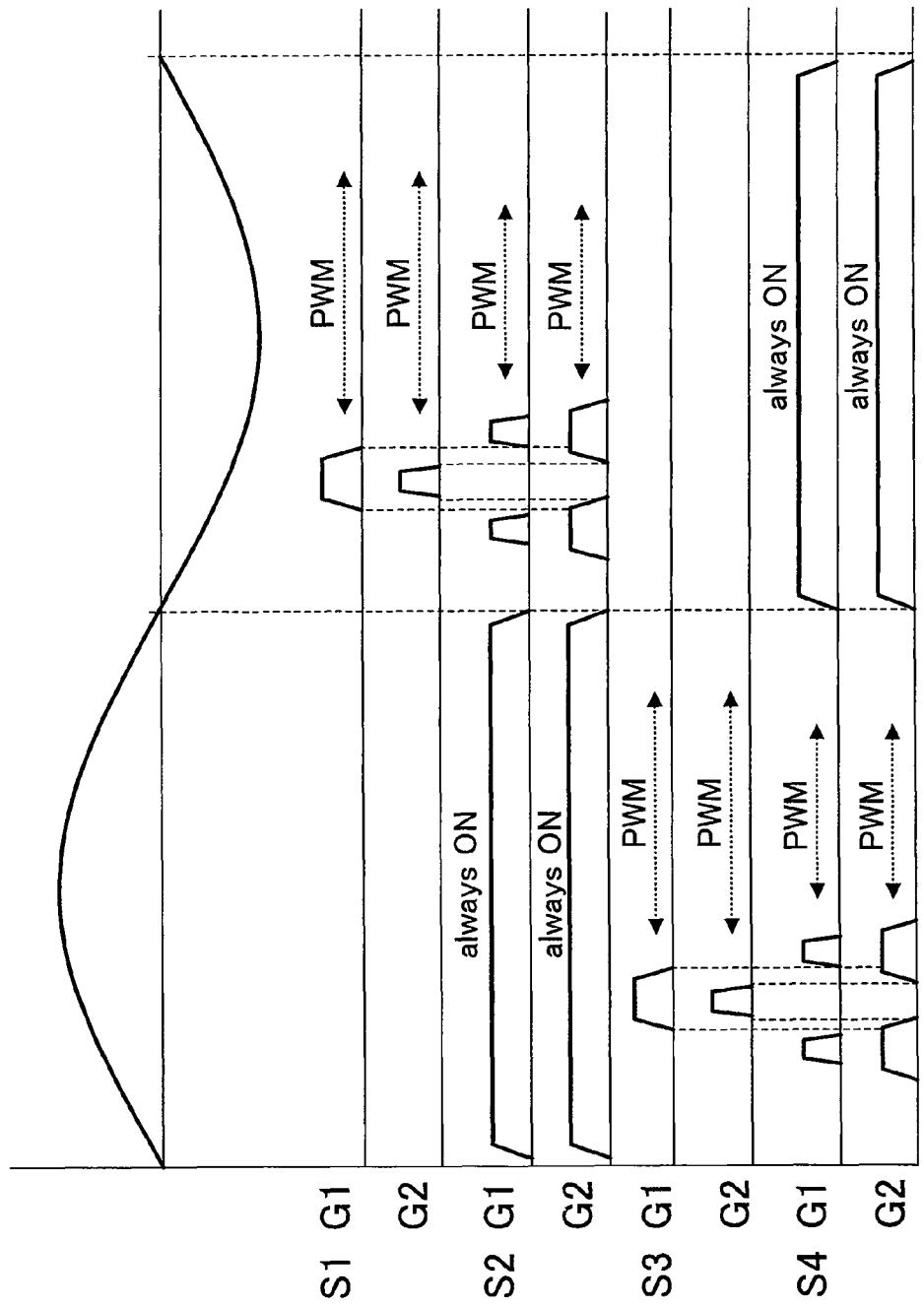
FIG. 9 is a timing chart showing the example converter circuit.

Next, operation of the control unit 28 will be described. FIG. 9 shows operation timings of the converter circuit 22, and FIGS. 10A and 10B show state transition of the converter circuit 22. When the power of the AC power supply 31 is converted into DC power (the capacitor 25 is charged or charge is supplied to the load), the bidirectional switch 2D is caused to be in the ON state so that charge is accumulated in the reactors 26 and 27, during the positive half cycle, as shown in FIG. 10A. When the bidirectional switch 2D is turned OFF, power is supplied via the bidirectional switch 2C to the capacitor 25 or the load as shown in FIG. 10B. During the negative half cycle, the ON and OFF states of the bidirectional switch 2B are similarly switched to supply power via the bidirectional switch 2A.

In this case, it is necessary to operate each bidirectional switch in a manner which prevents the upper and lower arms from being short-circuited in each of the first and second arms 23 and 24. Therefore, the control unit 28 causes only the first or second gate terminal of each bidirectional switch to be in the ON state, thereby causing the bidirectional switches 2A to 2D to transition via an intermediate state in which the bidirectional switches 2A to 2D operate as a diode.

Specifically, initially, during a period of time that charge is accumulated in the reactors 26 and 27, in the positive half cycle, a loop from the AC power supply 31, via successively the reactor 26, the bidirectional switch 2D, the bidirectional switch 2B and the reactor 26, back to the AC power supply 31 is formed as shown in FIG. 10A. In this case, in order to prevent the upper and lower arms from being short-circuited, the first and second gate terminals G1a and G2a of the bidirectional switch 2A are both caused to be in the OFF state. Therefore, the bidirectional switch 2A is caused to be in the fourth state in which a current is cut off in both forward and backward directions, and therefore, a problem does not occur even when the bidirectional switch 2B is in the third state in which the bidirectional switch 2B is in the ON state in both forward and backward directions. In this state, by causing the bidirectional switch 2D to transition via the second state to the third state (i.e., the bidirectional switch 2D is turned ON), input lines can be short-circuited, whereby charge can be accumulated in the reactors 26 and 27. Thus, even when the bidirectional switch 2B is caused to be in the third state, the upper and lower arms are not short-circuited, and therefore, a loss can be reduced in the bidirectional switch 2B. Changes in the state of each bidirectional switch in this case are shown in Table 1 below.

TABLE 1

| | State |
|---|---|
| 2A | 4 → 4 → 4 |
| 2B | 1 → 3 → 3 |
| 2C | 4 → 4 → 1 |
| 2D | 2 → 3 → 2 |

Next, during a period of time that accumulated charge is discharged, a loop from the AC power supply 31, via successively the reactor 26, the bidirectional switch 2C, the capacitor 25 or the load 32, the bidirectional switch 2B and the reactor 27, back to the AC power supply 31 is formed as shown in FIG. 10B. In this case, the bidirectional switch 2B continues to be in the ON state, and only the state of the second arm 24 is transitioned. The bidirectional switch 2D of the second arm 24 is transitioned via the second state for causing a current to flow from the reactors 26 and 27, to the fourth state in which a bidirectional current is cut off. The bidirectional switch 2D is transitioned to the second state and at the same time the bidirectional switch 2C is transitioned to the first state. As a result, the short circuit of the arms does not occur. Also, even if the bidirectional switch 2D is caused to be in the fourth state in the next step, the bidirectional switch 2C is caused to be in the second state in which the bidirectional switch 2C operates as a diode, and therefore, a current from the reactors 26 and 27 does not cause a problem.

Moreover, in the next step, the bidirectional switch 2C is transitioned from the first state to the third state, whereby a loop for causing a current to flow to the capacitor 25 or the load 32 is maintained. The bidirectional switch 2C is changed from the diode operation having an ON voltage to the third state having a small loss, whereby a loss due to the bidirectional switch 2C can be reduced.

Also, in the next step, the bidirectional switch 2C is transitioned form the third state via the first state to the fourth state, whereby a bidirectional current is eventually cut off. Changes in the state of each bidirectional switch in this case are shown in Table 2 below.

TABLE 2

|    | State                           |
|----|---------------------------------|
| 2A | 4 → 4 → 4                       |
| 2B | 3 → 3 → 1                       |
| 2C | 1 → 3 → 1                       |
| 2D | 4 → 4 → 2                       |

By repeatedly performing the aforementioned operation, control is performed during the positive half cycle of the AC power supply 31. Also, a similar process is performed during the negative half cycle, although it will not be described.

Note that, in order to prevent the arms from being short-circuited, it is necessary to prevent a short-circuit current from flowing from the upper arm to the lower arm in each of the first and second arms 23 and 24. Therefore, in each step, the second gate terminal G2a of the bidirectional switch 2A and the second gate terminal G2b of the bidirectional switch 2B are prevented from being simultaneously in the ON state, and the second gate terminal G2c of the bidirectional switch 2C and the second gate terminal G2d of the bidirectional switch 2D are prevented from being simultaneously in the ON state. Specifically, for example, in the case of the positive half cycle, during a cycle that charge is accumulated in the reactors 26 and 27, the states of the bidirectional switches 2A, 2B, 2C and 2D may be combined in any one of manners shown in Table 3. Also, during a cycle that charge is output to the capacitor 25 or the load 32, the states of the bidirectional switches 2A, 2B, 2C and 2D may be combined in any one of manners shown in Table 4.

TABLE 3

|    | States |   |   |
|----|--------|---|---|
| 2A | 4      | 4 | 4 |
| 2B | 1      | 3 | 3 |
| 2C | 4      | 4 | 1 |
| 2D | 2      | 3 | 2 |

TABLE 4

|    | States |   |   |
|----|--------|---|---|
| 2A | 4      | 4 | 4 |
| 2B | 3      | 3 | 1 |
| 2C | 1      | 3 | 1 |
| 2D | 4      | 4 | 2 |

As described above, in the converter circuit of this variation, a bidirectional switch having four operation modes (i.e., the first to fourth states), and therefore, a period of time during which a current flows in the first and second states in which the bidirectional switch operates as a diode can be reduced, and a current is caused to flow in the third state in which the loss is small. Therefore, power consumed by the bidirectional switch is attributed to the ON resistance in the third state, whereby the loss can be reduced. As a result, the size of a cooling fin or cooling fan can be reduced.

Note that, in the power conversion circuit, instead of the converter circuit (AC-DC converter circuit), other circuits, such as an inverter circuit and the like, may be used, and in this case, similar operation and advantages are achieved.

Also, during a period of time that charge is accumulated in the reactor, the ON and OFF states of the bidirectional switches 2B and 2D are switched to form a current path. Alternatively, in order to balance the ON-time period ratio of the bidirectional switches 2A to 2D (leveling of the amounts of heat generated in the bidirectional switches), the ON and OFF states of the bidirectional switches 2A and 2C may be switched to form a current path.

Moreover, although it has been described that the bidirectional switches 2B and 2D are caused to be always in the ON state during the positive and negative half cycles of the voltage of the AC power supply 31, the bidirectional switches 2B and 2D may caused to be in the ON state only during a period of time that a current path is formed.

In this disclosure, an example in which a normally-off bidirectional switch is employed has been shown. However, a normally-on bidirectional switch may be instead used, and in this case, the four operation states described above can also be achieved. Moreover, materials and configurations of the components of the bidirectional switch, such as a substrate, a semiconductor layer, an electrode and the like, may be changed as appropriate.

Industrial Applicability

The power conversion circuit of the present disclosure employs a bidirectional switch which can switch four states by controlling a gate signal, thereby making it possible to reduce a loss due to a circulating current, and therefore, is useful as power conversion circuits, such as a DC-DC converter device, an AC-DC converter device, an inverter device and the like.

The invention claimed is:

1. A power conversion circuit comprising:
at least one bidirectional switch,
wherein the bidirectional switch has a first gate terminal, a second gate terminal, a first ohmic terminal and a second ohmic terminal,
by causing the first gate terminal to be in the ON state and the second gate terminal to be in the OFF state, the bidirectional switch is caused to be in a first state in which the bidirectional switch operates as a diode having a cathode as the first ohmic terminal and an anode as the second ohmic terminal,
by causing the first gate terminal to be in the OFF state and the second gate terminal to be in the ON state, the bidirectional switch is caused to be in a second state in which the bidirectional switch operates as a diode having an anode as the first ohmic terminal e and a cathode as the second ohmic terminal, by causing the first and second gate terminals to be in the ON state, the bidirectional switch is caused to be in a third state in which the bidirectional switch is bidirectionally conductive without via a diode between the first and second ohmic terminals, and by causing the first and second gate terminals to be in the OFF state, the bidirectional switch is caused to be in a fourth state in which a bidirectional current is cut off between the first and second ohmic terminals.

2. The power conversion circuit of claim 1, wherein the bidirectional switch has
   a semiconductor multilayer structure formed on a substrate;
   a first ohmic electrode and a second ohmic electrode formed on the semiconductor multilayer structure with a space being provided therebetween;
   a first p-type semiconductor layer and a second p-type semiconductor layer formed between the first and second ohmic electrodes with a space being provided therebetween;
   a first gate electrode formed on the first p-type semiconductor layer; and
   a second gate electrode formed on the second p-type semiconductor layer,
the semiconductor multilayer structure includes a first nitride semiconductor layer, and a second nitride semiconductor layer which is formed on the first nitride semiconductor layer and has a larger band gap than that of the first nitride semiconductor layer, and the first gate electrode is connected to the first gate terminal, the second gate electrode is connected to the second gate terminal, the first ohmic electrode is connected to the first ohmic terminal, and the second ohmic electrode is connected to the second ohmic terminal.

3. The power conversion circuit of claim 1, further comprising:
   a unidirectional switch connected in series to the bidirectional switch; and
   a diode connected antiparallel to the unidirectional switch,
   wherein the bidirectional switch, the unidirectional switch and the diode constitute a first half-bridge circuit whose input or output is a connection node of the bidirectional switch and the unidirectional switch.

4. The power conversion circuit of claim 3, wherein the bidirectional switch is in the third state when a voltage at the connection node is higher than an output voltage of the first half-bridge circuit.

5. The power conversion circuit of claim 1, wherein the power conversion circuit includes multiple ones of the at least one bidirectional switch, and
two of the bidirectional switches are connected in series to constitute a second half-bridge circuit whose input or output is a connection node of the two bidirectional switches.

6. The power conversion circuit of claim 5, wherein when one of the two bidirectional switches is in the third state, the other bidirectional switch is in a state other than the third state, and
when one of the two bidirectional switches is in the fourth state, the other bidirectional switch is in a state other than the fourth state.

* * * * *